Figure 1:
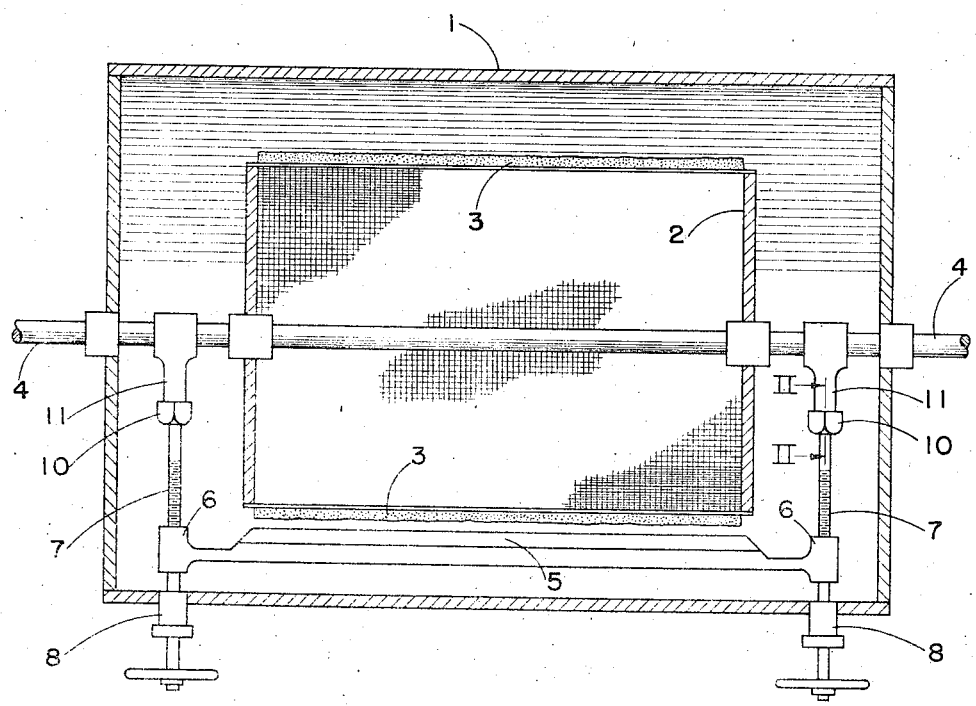

Jan. 15, 1946.   H. P. DAYTON   2,393,150
KNIFE MOUNT FOR HIGH TEMPERATURE PRECOAT FILTERS
Filed Dec. 9, 1943

Herbert P. Dayton INVENTOR.
BY P. J. Whelan
ATTORNEY.

Patented Jan. 15, 1946

2,393,150

UNITED STATES PATENT OFFICE 2,393,150

KNIFE MOUNT FOR HIGH TEMPERATURE PRECOAT FILTERS

Herbert P. Dayton, Baytown, Tex., assignor to Standard Oil Development Company, a corporation of Delaware Application December 9, 1943, Serial No. 513,606

3 Claims. (Cl. 210—201)

The present invention is directed to precoat filters and particularly to the scraping devices used in such filters.

There are two general types of precoat filters, the revolving drum type and the disc type. The first type consists of a cylindrical revolving drum housed in a shell of approximately the same shape. The cylindrical circumference of the drum is the filtering surface and the ends of the drum are closed. A cylindrical screen is fastened on the drum as a support for the precoat, which consists of several inches of clay or other filter aid. The precoat is applied by feeding a slurry of clay or other filter aid and oil into the shell and applying a vacuum on the inside of the drum, thus forcing the oil through the screen and depositing the filter aid upon the screen. The filtered precoat oil is pumped out.

The liquid to be filtered is pumped into the shell and the lower part of the revolving drum is kept under the liquid level. A vacuum is maintained on the vapor space inside of the drum with a vacuum pump and the liquid is filtered through the precoat and pumped out. The residue filtered from the liquid is left on the precoat surface and is scraped off continuously by a precoat cutting knife set on one side along the length of the cylinder. This knife is usually mounted on the shell in such a manner as to move with the expansion and contraction of the shell. The residue and precoat mixture are removed continuously by a screw conveyor or other automatic mechanism. The knife is usually adjusted to cut a thin layer of the precoat (normally .001" to .002" per revolution) in addition to the residue. Thus the thickness of the precoat is reduced as filtering continues, until, at a thickness of precoat of around ⅜", the filter cycle is completed. Filtering is then stopped, the precoat is removed and the precoating operation repeated.

In the disc type of filter the disc is actually a drum of short length rotating about its vertical axis, with an imperforate circumference and lower end and a screened upper end. Precoating and filtering with this type of filter is similar to the horizontal drum type except that the liquid to be filtered is sprayed upon about a half section of the filtering surface. The filter residue and a very thin layer of precoat are scraped off continuously by a knife mounted horizontally in the shell.

These filters are commonly used to filter hot suspensions. A typical use is the removal of contact clay or other solid from hot oil. It is desirable to maintain a uniformly thin knife cut on the precoat so as to obtain a maximum length of filter cycle. The knife is ordinarily mounted with screw adjustments on each end and is automatically advanced in a manner well known.

For normal operating temperatures of 570°–600° F. in the filtration of fuel oil, variations of 10°–30° F. are common, and these effect a change of as much as .002" in the distance between the knife edge and the drum (on an 8' diameter drum) due to the thermal expansion or contraction of the shell on which the knife is mounted. Since the knife is usually set to cut .001" to .002" of precoat per revolution, such temperature changes in the case of a drop may reduce the cut to almost zero, fouling the knife with the sticky residue filtered. In the case of a temperature rise, the depth of the cut may be increased by as much as 100 per cent, unduly shortening the filter cycle. This circumstance renders automatic adjustment ineffective and necessitates manual adjustment.

The principal object of the present invention is to provide a mounting for the knife in devices of the aforedescribed character which will make the adjustment of the knife with respect to the filter drum independent of expansion or contraction of the shell resulting from temperature changes.

Figure 2:
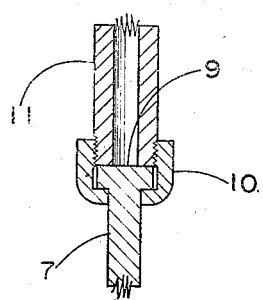

Further objects and advantages of the present invention will appear from the accompanying drawing, in which Fig. 1 is a plan view of one embodiment of the present invention with the shell cut away to reveal the interior, and Fig. 2 is a section along line II—II through a detail of Fig. 1.

In the drawing no attempt has been made to show the various structural features of the rotating filter with which the present invention is not concerned. They are simplified drawings intended to illustrate the novel features of the present invention only. For example, the automatic adjustment of the knife edge, which is well known in the art, is not illustrated.

Referring to Fig. 1 in detail, numeral 1 designates the shell, while numeral 2 designates the rotating filter with its precoat 3 mounted for rotation on axle 4 journaled in the ends of the shell and driven in the known manner.

The knife 5 is carried by sleeves 6 at either end thereof. Each sleeve 6 is internally threaded to receive a threaded rod 7, which is mounted in a packing gland or stuffing box 8 fixed to shell 1 in such a manner that the rod can move longitudinally freely with respect to the shell. The inner end of the rod is provided with a head 9 of such a configuration as to fit a recess formed by screwing a cap 10 on a socket 11 which is mounted on shaft 4 for free rotation with respect thereto. Elements 7, 10 and 11 are preferably made of Invar steel.

It will be seen that in this construction the position of the blade with respect to the filter drum is determined by the movement of sleeves 6 with respect to shaft 4 and is entirely independent of any expansion or contraction of shell 1.

It will be understood that the structure illustrated can be modified in design and arrangement of parts without departing from the principle involved. Such changes in construction, without departure from the principle, are contemplated within the scope of the present invention, the embodiment shown on the drawing being given for purposes of illustration only.

The nature and objects of the present invention having been fully described and illustrated, what I desire to claim as new and useful and to secure by Letters Patent is:

1. A rotating precoat filter having a shell, a centrally located shaft, a rotating filter surface journaled on the shaft and spaced from a shell, a knife blade arranged to act upon the filter surface, rods slidably mounted in said shell and extending therethrough arranged for screw-threaded engagement with said knife blade, means rotatably connected to the inner end of each of said rods and to said shaft for anchoring the inner ends of said rods, and means exterior of said shell for turning said rods.

2. A device in accordance with claim 1 in which the rods and their anchoring means are made of metal substantially insensitive to temperature changes.

3. A rotating precoat filter having a shell, a centrally located shaft, a rotating filter surface journaled on said shaft and spaced from said shell, a knife blade arranged to act upon the filter surface, rods slidably mounted in said shell and extending therethrough arranged for screw-threaded engagement with said knife blade, means in the interior of said shell and independent of radial expansion of said shell for anchoring the inner ends of said rods, and means exterior of said shell for turning said rods.

HERBERT P. DAYTON.